United States Patent [19]

Glaberson et al.

[11] Patent Number: 4,886,957

[45] Date of Patent: Dec. 12, 1989

[54] CARD READER FOR RECEIVING A CARD BEARING AN IMPRINTED DATA STRIP, SELF POSITIONING THE CARD IN A PRE-DETERMINED POSITION AND SCANNING THE IMPRINTED DATA STRIP IN TWO DIRECTIONS

[75] Inventors: John Glaberson, Newtown; Scott Santulli, Danbury, both of Conn.

[73] Assignee: Cauzin Systems, Incorporated, Waterbury, Conn.

[21] Appl. No.: 863,587

[22] Filed: May 15, 1986

[51] Int. Cl.⁴ .................... G06K 7/015; G06K 7/10
[52] U.S. Cl. ........................... 235/482; 235/483; 235/485; 235/454; 235/475
[58] Field of Search ............. 235/475, 476, 477, 479, 235/480, 482, 483, 484, 485, 449, 454; 360/2

[56] References Cited

U.S. PATENT DOCUMENTS

| | | | |
|---|---|---|---|
| 3,703,626 | 11/1972 | Shanrock | 235/477 |
| 3,705,396 | 12/1972 | Nagaki et al. | 235/485 |
| 3,752,962 | 8/1973 | Greskovics | 235/483 |
| 3,780,377 | 12/1973 | Osgood | 235/485 |
| 3,836,753 | 9/1974 | Pass | 235/477 |
| 3,849,631 | 11/1974 | Merlino et al. | 235/484 |
| 3,899,659 | 8/1975 | Nakai et al. | 235/483 |
| 4,149,669 | 4/1979 | Hermstein et al. | 235/482 |
| 4,204,638 | 5/1980 | Laude | 235/454 |
| 4,254,329 | 3/1981 | Gokey et al. | 235/454 |
| 4,592,042 | 5/1986 | Lemelson et al. | 235/475 |
| 4,672,184 | 6/1987 | Fujiwara et al. | 235/454 |
| 4,680,807 | 7/1987 | Stockburger et al. | 235/485 |
| 4,692,603 | 9/1987 | Brass et al. | 235/454 |

*Primary Examiner*—Alan Faber
*Assistant Examiner*—Robert A. Weinhardt
*Attorney, Agent, or Firm*—Haynes N. Johnson

[57] ABSTRACT

A card reader for reading data strips carried on cards, the reader having a housing with an input slot carrying a removable card alignment tray to receive the cards. A sensor is used to detect the presence of an inserted card and cause the card, once sensed, to be drawn in by card driving mechanisms and forced into, and held, in alignment. Alignment is three dimensional in that the card is held against two perpendicular guides and flat against a window. A detector senses when the card is in its aligned position and actuates an optical scanner to scan the data strip on the card. Scanning is through the window, assuring that the plane of the card is correct. When scanning is completed, the input mechanism is reversed to eject the card.

Proper alignment of the data strip relative to the scanner, occurs because (a) the scanner itself is positioned by a track, (b) the alignment tray (which holds the card being read) has end and side alignment guides to position the card relative to the scanner, and (c) the data strip is in a known, predetermined position on the card.

16 Claims, 5 Drawing Sheets

CARD READER FOR RECEIVING A CARD BEARING AN IMPRINTED DATA STRIP, SELF POSITIONING THE CARD IN A PRE-DETERMINED POSITION AND SCANNING THE IMPRINTED DATA STRIP IN TWO DIRECTIONS

FIELD OF THE INVENTION

This invention relates to readers for cards bearing bit-encoded data, i.e., data that is digitally-encoded in data strips on the face of the cards. The data is encoded on calling cards, credit cards, or the like by printing, thermal transfer, direct thermal, dot matrix, photography, or similar methods.

The amount of data that can be encoded by use of data strips exceeds that found in a bar code or a magnetic code occupying the same amount of space by at least an order of magnitude. Because of this, however, to obtain accurate readings, the data strip must be accurately aligned on the card, the card must be accurately aligned in the reader, and the reader must be capable of reading microscopic bits.

RELATED APPLICATIONS

Two patent applications, owned by a common assignee, are presently pending, the disclosures of which are incorporated in this application by reference. These are:

For the reader: Application Ser. No. 718,219, filed Apr. 1, 1985, now U.S. Pat. No. 4,692,603, issued Sept. 8, 1987, for Optical Reader For Printed Bit-Encoded Data and Method of Reading Same, herein the "reader application". For the data strip: Application Ser. No. 799062, filed Sept. 23, 1985, now U.S. Pat. No. 4,782,221, issued Nov. 1, 1988, for Printed Data Strip Including Bit-Encoded Information and Scanner Control.

BRIEF SUMMARY OF THE INVENTION

A card reader is provided for reading data strips carried on cards. The reader includes a housing with an input slot carrying a removable card alignment tray to receive the cards. Sensing means are located within the housing to detect the presence of a card and to control card-alignment driving mechanisms. The cards, once sensed, are drawn into the unit and forced into three-dimensional alignment for scanning. A detector senses when the card is in its aligned position and actuates an optical scanner to scan the data strip on the cards. Scanning is done through a transparent or open window to be certain that the plane of the card is properly aligned for scanning. When scanning is completed, the input mechanism is reversed to eject the card.

To assure proper alignment of the data strip relative to the scanner, (a) the scanner itself is positioned by a track, (b) the alignment tray (which holds the cards being read) has end and side alignment guides to position the card relative to the scanner, and (c) the data strip is in a known, predetermined position on the card.

The alignment tray can be removed and replaced with others having alignment guides in different positions. This allows the data strip to be printed in different positions upon the card and yet, by use of the proper tray, still be aligned with the scanner.

DETAILED DESCRIPTION OF THE INVENTION

Figure 1:
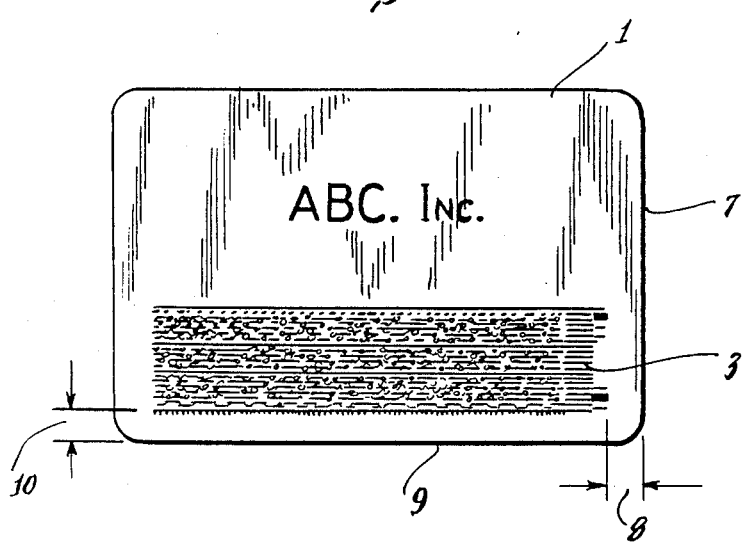
FIG. 1 is a plan view of a card having a data strip bearing bit-encoded data.

FIG. 1 shows a typical card 1 bearing a data strip 3. The data strip includes bit-encoded data. It is the same as the data strip disclosed in the data strip application. It includes a header to provide needed scanning information for the optical reader followed by a data portion including transverse lines of bit-encoded data.

A typical data strip, as used on a card of credit card size, might measure about 16 mm (⅝ inch) wide and 68 mm (2.5 inches) long. The maximum length on a card of this size is about 76 mm (3.0 inches). The encoded bits are generally rectangular and might measure 0.25 mm (0.010 inches) in each direction (This could vary, however, depending upon the desired density of encoding); and, for greater accuracy, data is recorded in dibit form. As a result, a typical card would carry some 1000 bytes of information.

Card 1 includes a leading edge 7 and a side edge 9. Data strip 3 is located upon card 1 at a known, predetermined distance 8 from edge 7 and at a known predetermined distance 10 from edge 9. Preferably, it is parallel to edge 9. This exact positioning is necessary so that, when the card is properly aligned with the scanner, the data strip will be properly aligned for scanning.

Data strip 3 is put on card 1 in any desired manner, such as by printing or one of the methods suggested above.

Figure 2:
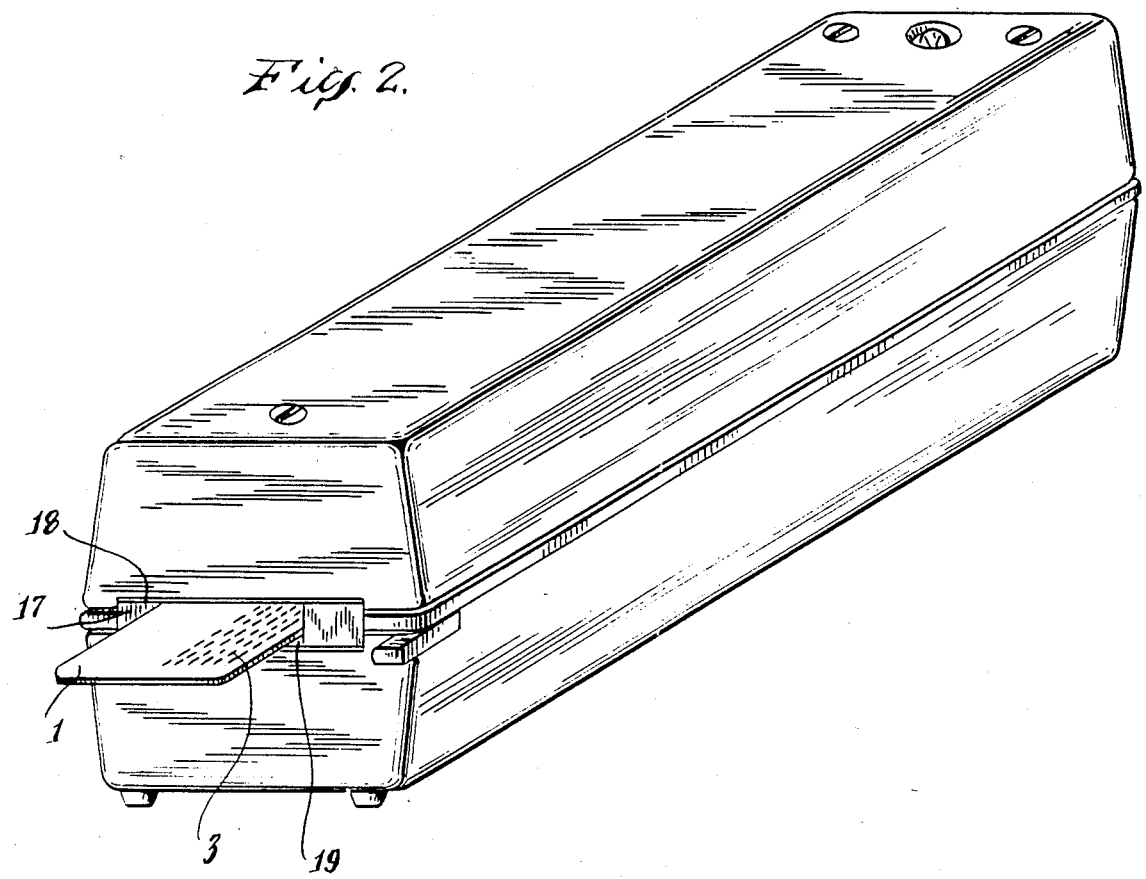
FIG. 2 is a perspective view of our reader showing a card being inserted into the input slot of the reader.
Figure 3:
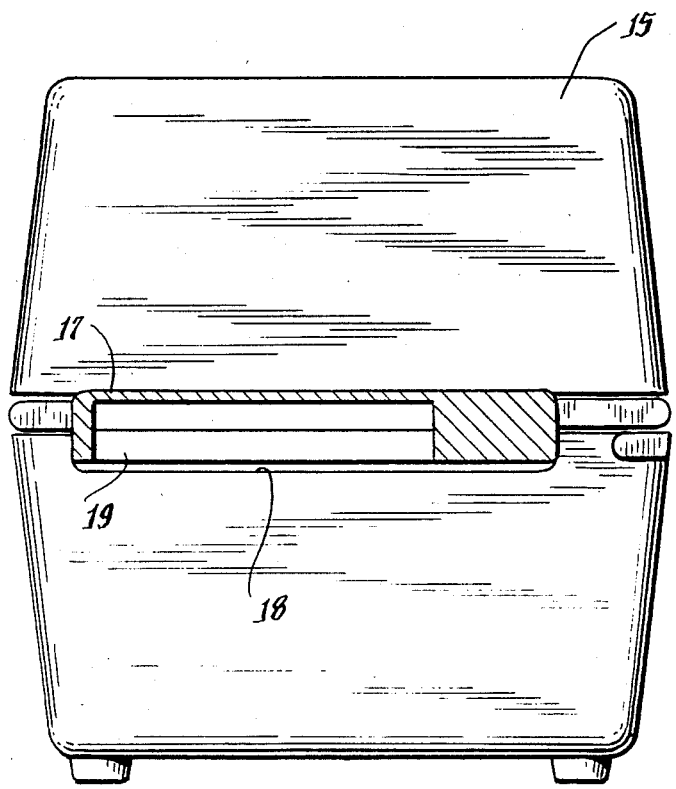
FIG. 3 is a front elevation showing the removable tray and the slot to receive a card.
Figure 4:
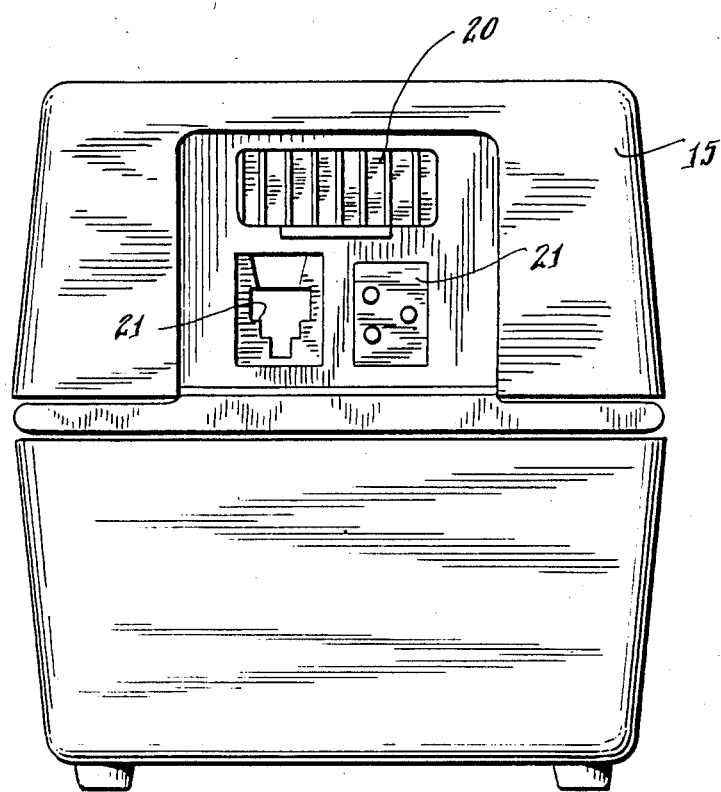
FIG. 4 is a rear elevation showing the power switch and the electrical connections to the reader.
Figure 5:
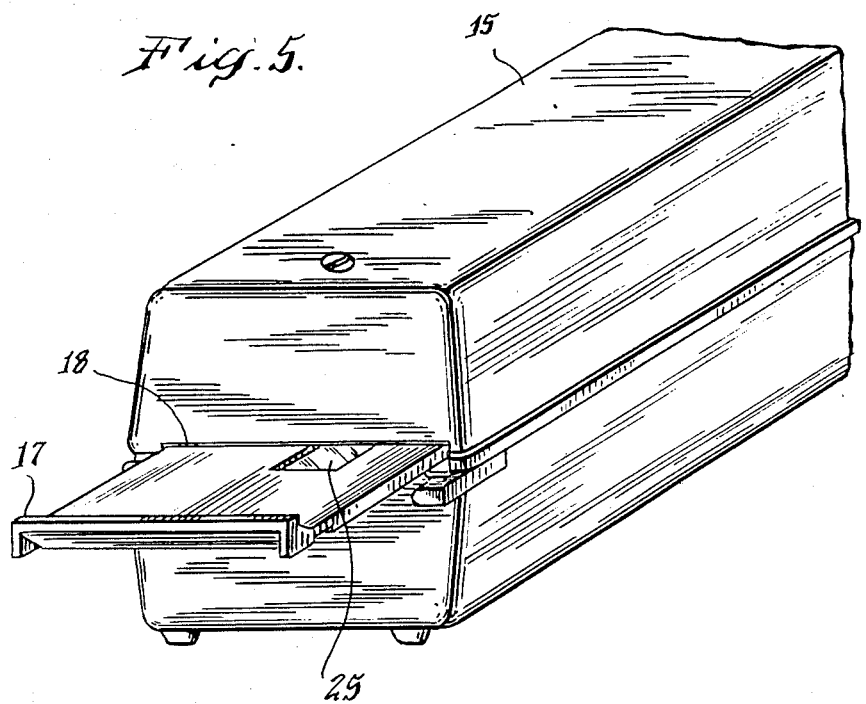
FIG. 5 is a partial front perspective view showing the alignment tray being inserted into the reader.
Figure 6:
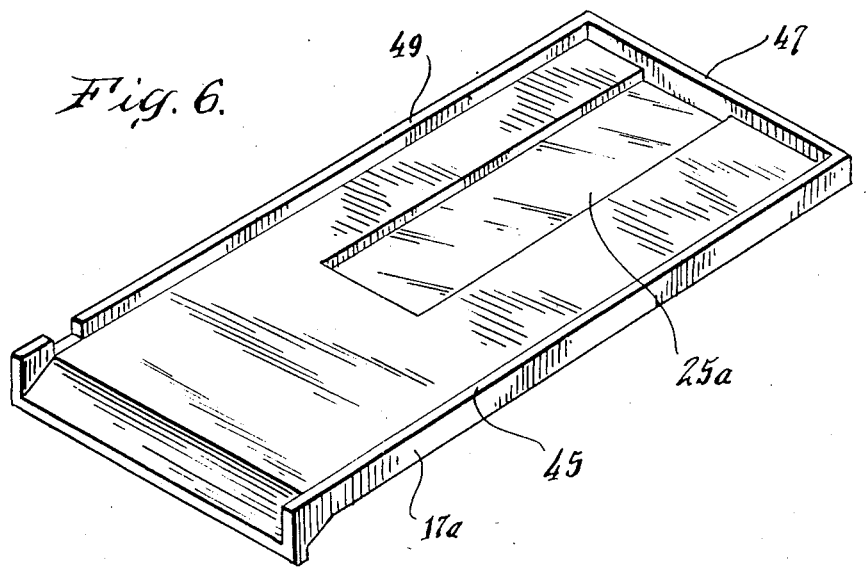
FIG. 6 is a perspective view of a modified form of alignment tray, shown upside down.
Figure 7:
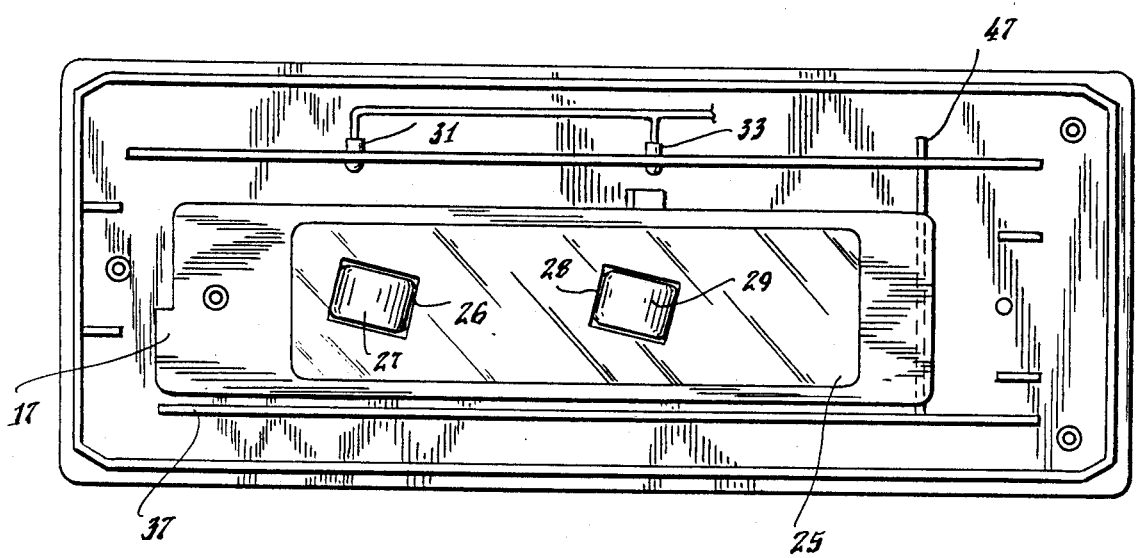
FIG. 7 is a top plan view of the inside of the reader showing the card-alignment mechanism.
Figure 8:
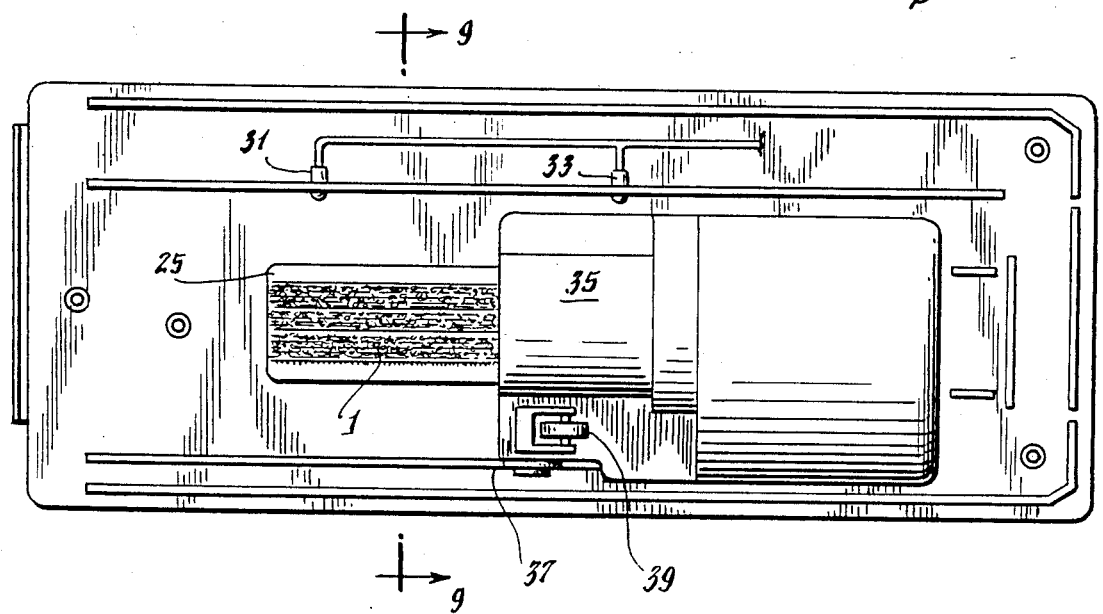
FIG. 8 is a view similar to FIG. 7 except showing a card in place and showing the scanner on its tracks.
Figure 9:
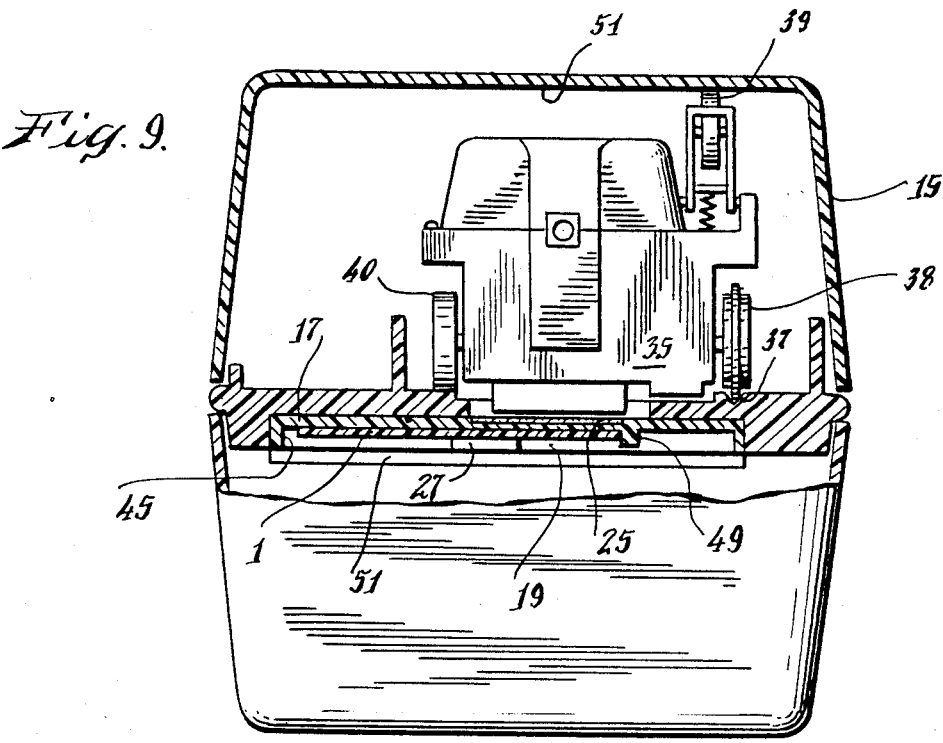
FIG. 9 is a transverse section on line 9—9 of FIG. 7, showing a card in place within the reader and the optical scanner in scanning position over the card.
Figure 10:
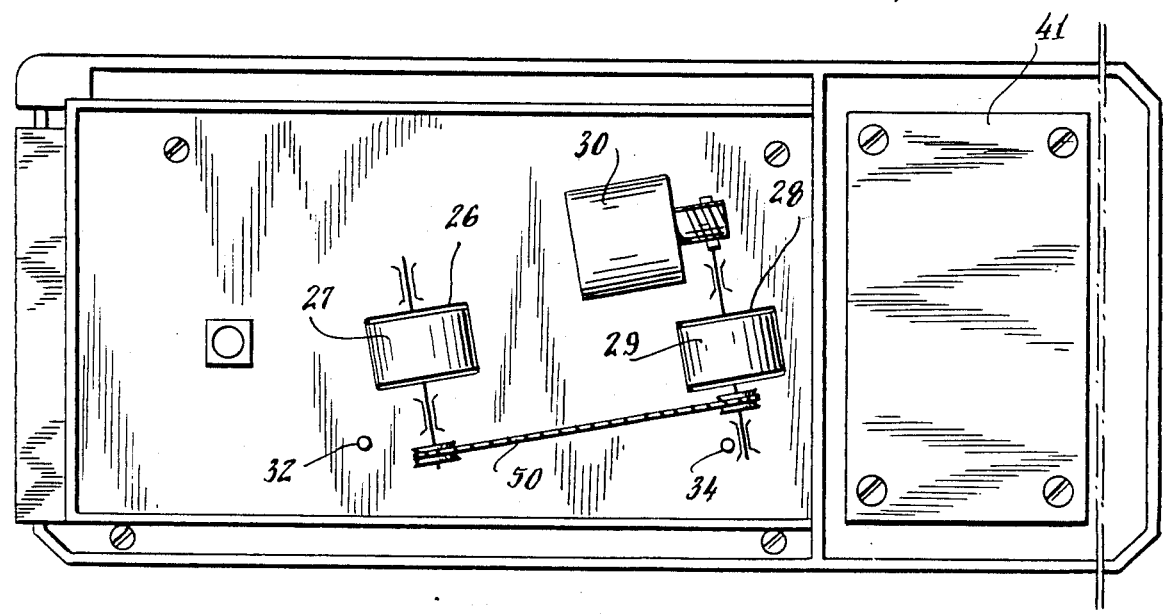
FIG. 10 is a bottom plan view, a view from underneath, showing details of the card-alignment mechanism.

The reader 15 is shown in FIGS. 2, 3, and 4. Reader 15 includes a card aligning tray 17 which fits in position in a slot 18 in the end of the reader 15 and is held by guides within the reader. Slot 18 and the lower side of tray 17 together form a slot 19 to receive card 1. (Note that in this preferred embodiment the card is positioned beneath tray 17). The insertion of a tray 17 into slot 18 of reader 15 is shown in FIG. 5.

Reader 15 also includes power switch 20 and the necessary electrical connections 21 to receive power and to transmit data from the data strip to a monitor, computer, or other type of receiver.

Details of the tray 17 and the structure for aligning card 1 for scanning are shown in FIGS. 6, 7, 8, 9, and 10. Preferably, window 25 of the tray is molded of clear plastic material and the undersurface of the tray includes three guides, i.e., two side guides 45 and 49 and end guide 47 (guide 47 is located at the end farthest removed from slot 19). The tray 17 includes a window 25 over the place where the data strip 3 will be located when it is scanned; and the window, or its edges if the window is open, serves as additional guide, keeping the data strip in the right plane. The window preferably is the size of the data strip to be read, or just slightly larger. There is also a lower entrance guide 51 at the slot 19, to support the card.

The dimensioning of the tray, guides, and window is such that, when the card is pressed tightly against end guide 47 and side alignment guide 45 and window, three-dimensional alignment is achieved and the card is in the proper position to be scanned.

Drive rollers 27 and 29 are below tray 17 and press upwardly slightly through openings 26 and 28, respectively, in the tray, so they will press the card firmly against the lower surface of the tray. The rollers are normally made of soft, foamed rubber or polyurethane which can frictionally grab and move the inserted card, but which will permit slippage when the card is in place.

The rollers are set at an angle to, rather than parallel to, the longitudinal dimension of the card. Thus, when actuated in the forward direction, the rollers not only pull the card into the reader but also press it against end guide 47 and side alignment guide 49. They also press it against the undersurface of window 25, or, if the window is an opening rather than a sheet of transparent plastic, they press the card against the edges of window 25. Thus, the rollers 27 and 29 serve to force the card 1 into three-dimensional alignment, i.e., against end guide 47, against side alignment guide 49, and against window 25. This alignment is valuable for achieving the most accurate scanning.

Drive rollers 27 and 29 are driven by motor 30 which drives roller 29 and which is connected to roller 27 by belt 50.

Actuation of the rollers and of the scanning cycle is controlled by photodetectors 31 and 33 receiving light for LEDs 32 and 34 (and associated circuitry, not shown, found in printed circuit board 41). Detector 31 is positioned above tray 17 and close enough to slot 19 to initially detect the presence of the leading edge 7 of a card as it is inserted. Upon this initial detection, the rollers 27 and 29 are caused to move in their forward (inward) direction to draw the card into the reader and align it. Detector 33 is positioned to detect the trailing edge of the card when the card has reached its aligned position. This serves to stop the rollers and to start the scanning cycle.

Tray 17 is preferably made of clear plastic. If it is not, however, it is necessary that it have holes in it to permit light from the LEDs to reach the detectors. Use of holes will also serve as a check to be certain that the tray is fully seated within the housing.

The structure and operation of scanner 35 is disclosed in the reader application; and this scanner is presently being sold under the trademark "Softstrip". The scanner has an alignment wheel 38 which fits in longitudinal track 37 and a supporting wheel 40 which rolls along a surface. It also includes a spring-pressed roller 39 pressing against the upper inner surface 51 of the reader housing to hold the scanner down in position. Correction for any possible remaining angular alignment errors between the scanner and the data strip is accomplished in the manner set forth in the reader application.

Scanner 35 moves from one end of the data strip 3 to the other and, at the same time, scans the data strip transversely along its transverse data lines. Consequently, when the scanner reaches the end of the data strip, all of the dibits of information will have been scanned. Window 25 is in the plane of focus of the scanner; and the scanning is done through this window. To keep the data strip in focus, it is important that the strip be held against the window so that it will be in the plane of focus of the scanning lenses. Rollers 27 and 29 hold it in this place. So that the scanning is directly along the transverse data lines of data on the data strip, it is important that the card bearing the data strip be aligned tightly against side alignment guide 49 and end alignment guide 47.

After the data strip 3 has been scanned, the scanner circuit signals the roller motor to drive rollers 27 and 29 in the reverse direction to eject the card from the reader. This reverse direction has a sidewise component of motion, pressing the card against exit guide 45 which causes it to be directed out the slot 19. This time, when the leading edge 7 of card 1 (now the following edge) passes the first detector 31, the rollers are signalled to stop. The scanner circuit also signals the scanner to return to its home position.

It is possible, by having removable trays, to accommodate different sizes of cards and different placements of the data strips on the cards. For example, one may use a tray such as tray 17a in FIG. 6. This has side alignment guide 49 further removed from window 25a, meaning that the data strip 3 should be on the card at a greater distance 10 than in the former example. The important thing, in any arrangement, however, is for the data strip 3 to be at a predetermined distance from the leading and side edges 7 and 9, that the guides 47 and 49 be located accordingly, and that all serve to locate and hold the data strip in properly aligned position in relationship to the scanner 35.

We claim:

1. A card reader for bi-directional scanning of the data strip on a card while said card is held in a fixed position, said reader including a housing to receive said card and a bi-directional optical scanner mounted within said housing in a position to scan said card while said card is held stationary in a predetermined position within said housing, said reader including alignment means for positioning said card in said predetermined position within said reader, said alignment means including a pair of perpendicular alignment guides for receiving adjacent edges of said card and a window for positioning a planar surface of said card, a card driver to move said card to scanning position against said guides and said window and hold said card stationary during scanning, an input detector and an alignment detector, said input detector being located proximate to an input slot in said housing and including circuitry to cause said card driver, upon detection of the presence of a said card, to draw said card into said reader and to position it for scanning, and said alignment detector being adapted to sense when said card is in said predetermined position for scanning and to actuate said optical scanner, whereby said card may be inserted into said card reader and thereafter automatically be positioned in three dimensions for scanning and scanned.

2. A card reader as set forth in claim 1 in which said window is formed of transparent plastic material.

3. A card reader as set forth in claim 1 in which said card driver is a pair of frictional rollers positioned within said housing at an angle to be longitudinal dimension of said card and means for driving said rollers.

4. A card reader as set forth in claim 3 in which said alignment means also includes means for driving said rollers in a reverse direction to eject said card from said reader.

5. A reader adapted to read a data strip imprinted on a surface of a card, said card being of predetermined size and shape and said data strip being in a predetermined position on said card, said reader including a housing, a tray positioned within said housing to receive said card and to hold said card for scanning, said tray having a window and including positioning guides corresponding to adjacent edges of said card, positioning means for receiving said card, pressing adjacent edges of said card against said guides, pressing said card surface bearing said data strip against said window, and holding said card motionless during scanning, a bi-directional optical scanner positioned within said housing for scanning said data strip through said window, a sensor adapted to detect when said card is in position to be scanned, and a control circuit, actuated by said sensor, to start operation of said scanner, whereby said card may be automatically positioned for reading and the data strip thereon may be read.

6. A reader as set forth in claim 5 in which said positioning guides are perpendicular to one another and are positioned to receive the leading edge and one side edge of said card.

7. A reader as set forth in claim 6 in which said window is formed of transparent plastic material.

8. A reader as set forth in claim 5 including an inlet slot in said housing proximate to said tray for receiving said card and a detector to sense the presence of a said card inserted in said inlet slot and to actuate said positioning means.

9. A reader as set forth in claim 5 in which said positioning means is a plurality of driven rollers having parallel axes, said axes being at such an angle as to cause said rollers to direct said incoming card against both of said guides.

10. A reader as set forth in claim 9 in which said rollers have a surface providing for frictional, but slipping, engagement with said card.

11. A reader as set forth in claim 5 in which said positioning means is reversible and can thereby eject said card from said housing after said card has been scanned.

12. A reader as set forth in claim 11 including an ejection guide positioned on said tray for directing said card out of said housing, said ejection guide being spaced from said positioning guides by a distance greater than the corresponding dimension of said card, so said card fits loosely between said ejection guide and its corresponding said positioning guide.

13. A reader as set forth in claim 5 in which said tray is removably held in said housing, whereby other said trays may be substituted for it to accommodate a different card.

14. In a reader for a card bearing a data strip and requiring accurate three-dimensional alignment, that improvement including a card-positioning tray, alignment guides perpendicular to one another on said y and corresponding to adjacent edges on said card, a fixed scanning window in said tray associated with said guides and proximate thereto, a bi-directional optical scanner, means for moving said scanner in scanning motion over said scanning window, and means remote from said scanning window for receiving said card and moving said card to said scanning window, and means for pressing said card against said window and said guides and holding said card immobile during scanning, whereby said card may be held in three-dimensional alignment during scanning and scanned bi-directionally.

15. A reader adapted to read a data strip imprinted on a surface of a card, said card being of predetermined size and shape and said data strip being in a predetermined position on said card said reader including a housing, a tray positioned within said housing to receive said card and to hold said card for scanning, said tray having a window and including positioning guides corresponding to adjacent edges of said card, said tray being removably held in said housing, positioning means for receiving said card, pressing adjacent edges of said card against said guides, pressing said card surface bearing said data strip against said window, and holding said card motionless during scanning, a bi-directional optical scanner positioned within said housing for scanning said data strip through said transparent surface, a sensor adapted to detect when said card is in position to be scanned, and a control circuit, actuated by said sensor, to start operation of said scanner, whereby said card may be automatically positioned for reading, said data strip thereon may be read, and an other tray may be substituted to accommodate a different card.

16. In a reader for a card bearing a data strip and requiring accurate three-dimensional alignment, that improvement including a card-positioning tray, alignment guides perpendicular to one another on said tray and corresponding to adjacent edges on said card, a scanning window in said tray associated with said guides and proximate thereto, a bi-directional optical scanner, means for moving said scanner in scanning motion along said scanning window, and means for receiving said card pressing said card against said window and said guides, and holding said card immobile during scanning, said last-named means including a pair of driven rollers having axes which are parallel to one another and which are at an angle to the longitudinal dimension of said data strip, whereby said card may be held in three-dimensional alignment during scanning and scanned bi-directionally.

* * * * *